United States Patent [19]
Rodondi et al.

[11] Patent Number: 5,620,158
[45] Date of Patent: Apr. 15, 1997

[54] WIRING ASSEMBLY ADHESIVE FASTENER

[75] Inventors: Andrew F. Rodondi, Sharpsville, Pa.; David R. Peterson, Aurora, Ohio; John A. Yurtin, Southington, Ohio; Charles M. Brigham, II, Warren, Ohio

[73] Assignee: General Motors Corporation, Detroit, Mich.

[21] Appl. No.: 352,477

[22] Filed: Dec. 9, 1994

[51] Int. Cl.⁶ .................................................. F16L 3/22
[52] U.S. Cl. ................................................ 248/69; 248/74.3
[58] Field of Search ........................... 248/65, 68.1, 74.3, 248/300, 205.3, 467, 909

[56] References Cited

U.S. PATENT DOCUMENTS

| | | | |
|---|---|---|---|
| 3,463,427 | 8/1969 | Fisher | 248/68 |
| 3,471,109 | 10/1969 | Meyer | 248/74.3 |
| 3,486,725 | 12/1969 | Hidassy | 248/74.3 |
| 3,516,631 | 6/1970 | Santucci | 248/71 |
| 3,659,319 | 5/1972 | Erickson | 24/73 AP |
| 3,885,084 | 5/1975 | Kaiserswerth et al. | 174/35 MS |
| 4,352,476 | 10/1982 | Meeks | 248/74 R |
| 4,440,374 | 4/1984 | Achille | 248/544 |
| 4,609,171 | 9/1986 | Matsui | 248/74.3 |
| 4,974,798 | 12/1990 | Harding et al. | 248/73 |
| 5,308,253 | 5/1994 | Maki | 248/205.3 |

*Primary Examiner*—Leslie A. Braun
*Assistant Examiner*—Willie Berry, Jr.
*Attorney, Agent, or Firm*—Cary W. Brooks; William A. Schuetz

[57] ABSTRACT

A fastener comprising a T-shaped plastic planar member has a base which can be taped to a wiring assembly or harness and a normally extending trunk which has a pressure sensitive adhesive pad secured to a portion thereof adjacent the base and which has a releasable cover overlying the adhesive pad to protect the same during handling, but which can be unfolded to expose the adhesive pad to enable the pad to be fastened to a panel of the vehicle by merely pressing it onto the panel.

4 Claims, 1 Drawing Sheet

WIRING ASSEMBLY ADHESIVE FASTENER

The present invention relates to a fastener for attaching an electrical wiring assembly or harness to a support and, more particularly, to a fastener which is taped to the wiring assembly and has a foldable cover overlying a pressure sensitive adhesive pad, the cover being foldable to uncover the adhesive pad to enable the same to be pressed onto a support.

Many of the electrical wiring assemblies or harnesses for use in automotive vehicles have to be secured to a body or support panel of the vehicle. It is common to use clips which are either attached to or encircle the wiring harness and then to secure the clip on the panel via the use of a fastener, such as a screw. Another common method of securing the wiring harness to a support panel is through the usage of clips having deflectable headed stems which are snap fittingly connected to the support panel pushing the same through openings in the panel. Also, U.S. Pat. No. 4,974,798 shows a T-shaped fastener whose base is taped to a wiring harness and which has latching prongs which can be snap fittingly connected to a latch receptacle on the panel of a vehicle. While all of these attachment methods have been successfully used, they nevertheless require that the support panel be provided with openings for receiving the fasteners or require latch receptacles for receiving the latch on the fastener. Also, these methods require that the fasteners be fairly accurately attached to the wiring harness so that they will be positioned adjacent the attachment clip opening or latch receptacle in the panel.

The present invention provides a novel wiring harness fastener which does not require that the support panel be provided with any fastener openings or receptacles. The present invention provides a fastener which can be securely taped to a wiring harness, which has a pressure sensitive adhesive pad secured to a trunk portion of the fastener and which has a releasable or foldable cover overlying the adhesive pad to protect the same during handling, but which can be readily unfolded to expose the adhesive pad to enable the pad to be fastened to the panel by merely pressing it onto the panel.

More specifically, the present invention provides for a one piece, plastic, T-shaped planar member having an elongated base and a trunk extending normal to the base. The base at its opposite ends has upwardly and downwardly extending ears and the base is adapted to be taped to a wiring assembly or harness via a tape means which encircles the wiring assembly and the base at locations between the ears and the trunk. The fastener further includes a pressure sensitive adhesive pad secured to a lower or first portion of the trunk located adjacent to the base and with the trunk having another upper or second portion in the form of a cover connected via a fold line to the lower portion can be folded over the pressure sensitive adhesive pad and into juxtaposed engagement therewith until the fastener is to be used. The fastener is attachable to a support panel by unfolding the cover from the adhesive pad and then pressing the adhesive pad onto the support panel. The usage of the adhesively secured fastener, eliminates the need for providing openings or receptacles on the support panel and enables the fastener to be attached to the support panel at any location thereon.

The novel fastener of the present invention can also be readily and inexpensively manufactured by extruding a flat sheet of plastic material, such as polyolifin, then die stamping the same to the shape desired, then adhesively securing an adhesive pad and then folding the cover along its fold line over the adhesive pad.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
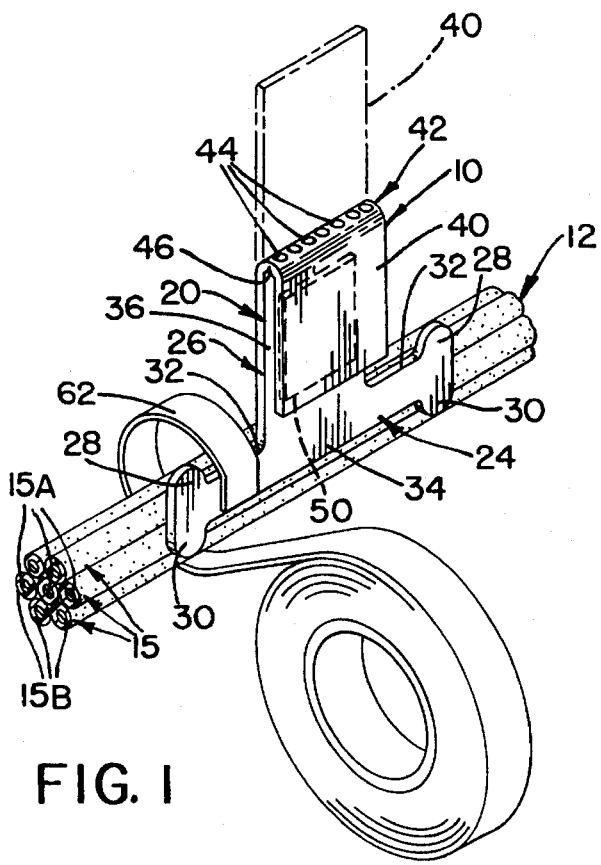
FIG. 1 is a fragmentary perspective view of the novel fastener of the present invention and showing the same being connected to a wiring assembly.
Figure 2:
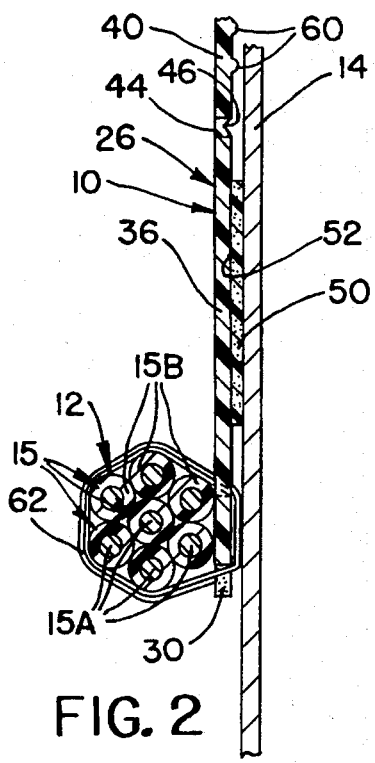
FIG. 2 is an enlarged cross sectional view of the novel fastener of the present invention and showing the same connected to a wiring assembly and a support panel.

Referring to the drawings, a novel fastener 10 for attaching or securing a wiring assembly 12 to a body panel 14 is thereshown. The wiring assembly 12 is shown as comprising a plurality of electrical cables or conductors 15 which are bunched together. The electrical cables 15 would have an inner metal electrically conductive core 15A and an outer insulating sheath 15B. The cables 15 could either be taped together to form the wiring assembly 12, as shown in FIG. 1, or could be pretaped together or located in a corrugated conduit (not shown). The wiring assembly 12 constitutes a wiring harness.

The automotive body panel 14 could any suitable body panel, such as a side support panel, a floor pan or a floor panel in a trunk of the vehicle.

Figure 3:
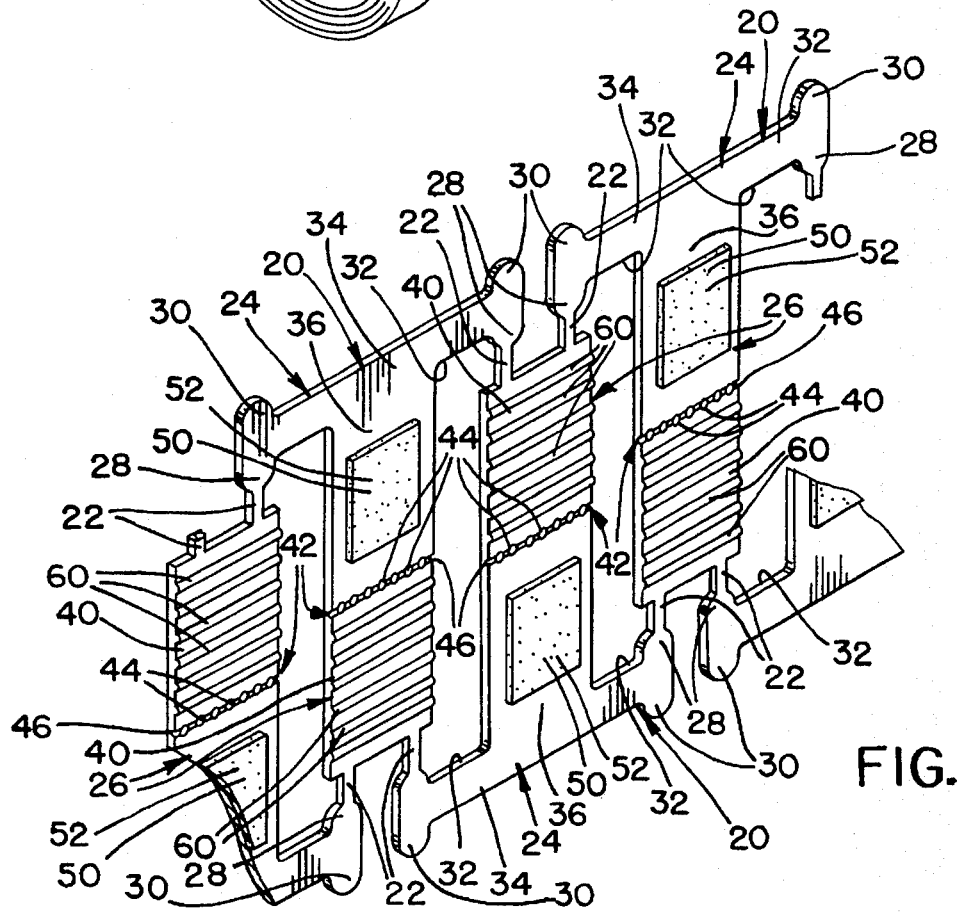
FIG. 3 is a fragmentary perspective view of the novel fastener of the present invention and showing the same in the as-manufactured state prior to being attached to a wiring assembly or harness.

The novel fastener 10 comprises a one piece, planar, plastic T-shaped member 20, as best shown in FIGS. 1 and 3. The T-shaped member 20 is formed by extruding a planar plastic sheet and then die stamping the sheet to the configuration shown in FIG. 3 to provide a plurality of side by side T-shaped members 20 which are interconnected to each other via breakable webs or connector portions 22. Alternate ones of the T-shaped members 20 are located upside down and rightside up so as to be interdigitated to maximize the number that can be formed per given linear foot of sheet material.

Each T-shaped member 20 has an elongated base 24 and a centrally located trunk 26 which extends perpendicular to the longitudinal axis of the base 24. The base 24 at each of its opposite ends has upwardly and downwardly extending ears 28, 30. The ears 28 in conjunction with the trunk 26 define a pair of notches 32 therebetween and the ears 30 together define a notch 34 therebetween.

The trunk 26 has a lower or first portion 36 located adjacent the base 24 and an upper or second portion 40 which is integrally connected to the lower portion 36 via a fold line or hinge 42. The fold line 42 is formed by providing a plurality of laterally spaced through openings 44 and a heavy score line or groove 46 so that the cover 40 can be readily, pivotally hinged relative to the lower portion 36 of the trunk 26, and for a reason that will be hereinafter more fully described.

The lower portion 36 of the trunk 26 carries a planar, rectangularly shaped, pressure sensitive adhesive pad 50. The pressure sensitive adhesive pad 50 could be made from any suitable or conventional adhesive material and would be securely, adhesively retained on the lower portion 36. The pad would have an outer planar surface 52 which is adapted to be covered over by the cover 40.

After the plastic sheet is extruded and die stamped to the configuration shown in FIG. 3, the adhesive pads 50 would be adhesively secured to the lower portions 36 of the trunks 26. Thereafter, each T-shaped member 20 would be detached from the sheet by breaking its associated breakable webs 22 to release the T-shaped member 20 and then the cover 40 can be folded over along the fold line 42 to cover the adhesive pad 50 to protect the same until the fastener 10 is to be used.

To enable the cover 40 to be more readily released from engagement with outer surface 52 of the adhesive pad 50, the cover 40 on its side 54 facing the adhesive pad 50 is provided with a plurality of spaced ridges 60, vertically spaced ridges as viewed in FIG. 3, so as to reduce the area of contact with the outer surface 52 of the adhesive pad 50. The ridges 60 could either be extruded during the extruding operation or they could be formed during the die stamping operation.

The novel fastener 10, when used, would be positioned against the wiring assembly or harness 12, as shown in FIG. 1, and then the base 24 would be taped thereto via a tape means 62. The tape means would be wrapped around a couple of turns in both of the notch areas 32 of the base 24 on both sides of the trunk 26 and the common notch area 34 to securely retain the base on the wiring assembly 12. The ears 28, 30 prevent the tapes 62, which are wrapped around the base 24 on both sides of the trunk 26 from sliding off the base 24 in directions parallel to the longitudinal axis of the base 24 or wiring assembly 12. Thereafter, the cover 40 would be unfolded from the adhesive pad 50 and then the adhesive pad 50 would be pressed against the body panel 14 to secure the fastener 10 to the body panel 14. The cover 40 would preferably be left in its uncovered position, as shown by the phantom lines in FIG. 1, or it could be snipped or cut off if desired.

From the foregoing, it should be apparent that a novel T-shaped fastener has been provided for readily connecting a wiring assembly or harness to a body panel of a vehicle and wherein the fastener does not require the body panel to have any holes therein or latching receptacles. In addition, it can be seen that the fastener can be readily attached to a wiring assembly and connected at any location along the body panel.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A fastener for attaching an electrical conductor to a support structure comprising a one piece, plastic T-shaped member having an elongated base which is adapted to be secured to said electrical conductor and a trunk extending normal to the base intermediate its ends, said trunk having a first portion adjacent said base and a second portion remote from said base and integrally connected to said first portion along a fold line extending generally parallel to said base, a flat pressure sensitive adhesive pad secured to one side of said first portion, said second portion being folded along said fold line and into juxtaposed removable engagement with said flat adhesive pad on said one side of said first portion, said fastener being attachable to said support structure by unfolding said second portion from said flat adhesive pad on said first portion and thereafter pressing said pad onto said support structure.

2. A fastener for attaching a wiring assembly to a vehicle support panel comprising:

a one piece, planar, plastic T-shaped member having an elongated base and a trunk extending normal to said base, said base at its opposite ends having upwardly and downwardly extending ears, tape means for securing said base to said wiring assembly, said tape encircling said wiring assembly and said base at said locations between said ears and said trunk, said trunk having a first portion adjacent said base and a second cover portion remote from said base and integrally connected to the first portion along a fold line extending generally parallel to said base, a flat pressure sensitive adhesive pad secured to one side of said first portion, said cover portion being folded along said fold line and into juxtaposed removal engagement with said flat adhesive pad on said one side of said first portion, said fastener being attachable to said support structure by unfolding said cover from said flat adhesive pad on said first portion and thereafter pressing said adhesive pad onto said support structure.

3. A fastener, as defined in claim 2, and wherein said cover on its side which engages the adhesive pad includes a planar portion and a plurality of spaced raised ridges extending above the planar portion so that only the ridges releasably engage said pad to reduce the area of contact therewith to enable the cover to be more readily released from the flat pressure sensitive pad when it is desired to attach the fastener to the body panel.

4. A fastener, as defined in either claims 1 or 2 and wherein said pressure sensitive adhesive pad is planar and is itself adhesively secured to said first portion of said trunk.

* * * * *